April 12, 1932.  B. T. BORDEN  1,853,255
WORKHOLDER
Filed March 7, 1928
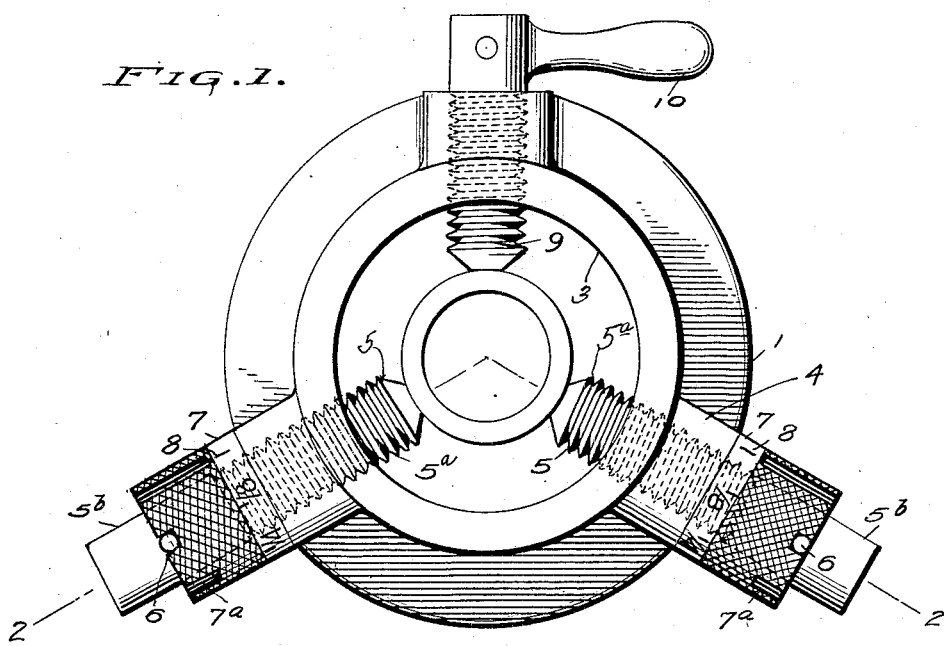
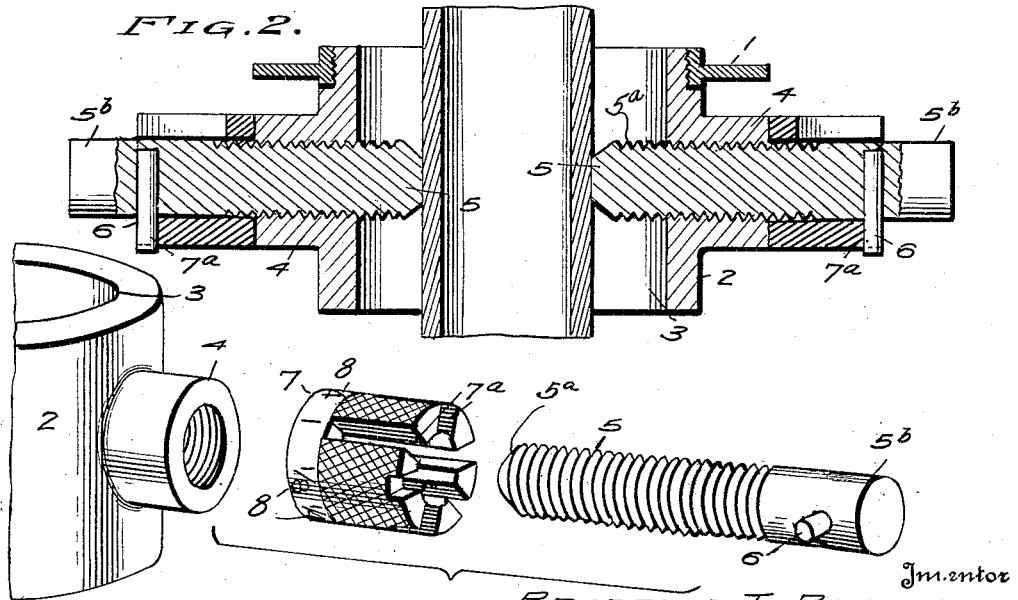
Inventor
BRADFORD T. BORDEN Patented Apr. 12, 1932

1,853,255

UNITED STATES PATENT OFFICE

BRADFORD T. BORDEN, OF LAKEWOOD, OHIO, ASSIGNOR, BY MESNE ASSIGNMENTS, TO THE BORDEN COMPANY, OF WARREN, OHIO, A CORPORATION OF OHIO

WORKHOLDER

Application filed March 7, 1928. Serial No. 259,768.

My invention relates to work holders and is particularly adapted to use in connection with die stocks and the like, although capable of other adaptations.

Briefly stated,—the invention has for its primary object to provide a device of this kind incorporating a very simple and novel kind incorporating a very simple and novel means whereby the work-engaging element or elements may be readily adjusted for work of different known standard sizes.

Other objects and advantages of the invention residing in the various details, combinations of elements and modes of operation will be readily appreciated by those skilled in the art as the description proceeds, reference being had to the accompanying drawings, which illustrate my preferred embodiment of the invention. It is to be understood, of course, that the invention is capable of various changes and modifications within the scope of the subject matter claimed hereinafter.

In the drawings, wherein the same reference characters have been used to designate the same parts in all views, Figure 1 is a bottom plan view of a work holder incorporating my invention;

Figure 2 is a cross sectional view taken on the line 2—2 of Figure 1;

Figure 3 is a group perspective view showing the parts disassembled.

Referring specifically to the drawings, numeral 1 indicates an annular body having at one side a laterally extending flange 2 located at the margin of the work receiving hole 3, said flange having a plurality of radially spaced boss-like enlargements 4, as shown.

The work engaging shanks 5 have screw threaded inner ends 5$^a$ and these extend through the tapped bosses 4 to engage the work in the hole 3. The outer ends of the shanks 5 are smooth, as indicated at 5$^b$ and each is adapted to receive for axial sliding movement the exteriorly knurled washer 7. Inasmuch as the shanks 5 are identical a description of one will suffice for all.

Each shank has adjacent its outer end a lateral pin 6 which may be threaded or otherwise rigidly secured in the shank. The pin 6 is adapted to selectedly engage in the edge slots 7$^a$ of the washer 7 so as to variably limit the movement of the washer in the direction of the unthreaded extremity 5$^b$ of the shank 5. As shown the slots 7$^a$ are of different lengths, the washer 7 being graduated or marked as indicated at 8 to indicate the proper slot setting for a predetermined standard size of work.

The mode of operation of the structure shown in Figures 1–3 will be readily understood. The several pins 6 are engaged in the proper slots 7$^a$ according to the size of work to be operated upon and the shanks are screwed up until the inner ends of the washers engage the outer ends of the bosses 4, which of course, limits the movement of the shanks in an advancing direction. Inasmuch as the slots 7$^a$ are at the rear ends of the washers 7 it is necessary to assemble the washers on the shanks before the same are screwed into the bosses 4. It is proper to mention that two of the shanks 5 are preferably used, there being a third shank 9 having a hand lever 10. The two shanks 5 are first set to the desired size and then the third shank 9 is tightened up to cause the work to bear firmly against the ends of the shanks 5.

It will be manifest that a device of this kind constructed in accordance with my invention can be accurately set for standard sizes of work in a very expeditious fashion and furthermore it will be clear that the device is admirably adapted for use in engaging odd sized work as well.

Having thus described my invention, what I claim as new and desire to secure by Letters Patent is:

1. A device of the class described comprising a shank having its inner end threaded, the outer end of said shank being smooth, a sleeve slidable upon the smooth portion of said shank and having a plurality of longitudinally extending edge notches of different depths in one end, the smooth portion of said shank having a hole adjacent the outer end, a laterally extending pin engaged in said hole and being adapted to selectively engage the several notches referred to above.

2. A device of the class described comprising a shank having its inner end threaded, the outer end of said shank being smooth, a sleeve slidable upon the smooth portion of said shank and having a plurality of longitudinally extending edge notches of different depths in one end, the smooth portion of said shank having a hole adjacent the outer end, a laterally extending pin engaged in said hole and being adapted to selectively engage the several notches, referred to above, a body portion having a boss in which said threaded shank portion works, and the unnotched end of said sleeve being adapted to engage said boss to limit the movement of said shank in an advancing direction.

3. A work holder of the class described comprising an annular body portion having a plurality of radially spaced bosses, work engaging shanks having threaded portions taking in said bosses whereby the shanks may be adjusted to engage the work within said body, the outer portions of said shanks being smooth, sleeves mounted upon the smooth portions of said shanks and having a plurality of longitudinal radially spaced notches in the rear edges thereof, said notches being of different lengths, a laterally extending pin carried by the smooth portion of said shank and adapted to selectively engage said notches whereby to variably limit movement of said sleeve in the direction of the outer extremity of said shank.

4. A work holder of the class described comprising an annular body portion having a plurality of radially spaced bosses, work engaging shanks having threaded portions taking in said bosses whereby the shanks may be adjusted to engage the work within said body, the outer portions of said shanks being smooth, sleeves mounted upon the smooth portions of said shanks and having a plurality of longitudinal radially spaced notches in the rear edges thereof, said notches being of different lengths, a laterally extending pin carried by the smooth portion of said shank and adapted to selectively engage said notches whereby to variably limit movement of said sleeve in the direction of the outer extremity of said shank, and said sleeves having indicia opposite the respective notches to indicate the proper notches to engage said pins when a predetermined size of work is to be operated upon, the inner ends of said sleeves engaging the outer ends of said bosses to limit movement of the shank in a work engaging direction.

5. The combination of a frame, a screw threaded therein, a collar surrounding the screw and having a sleeve portion with slots extending through it radially and to various depths, and an outwardly projecting member on the screw adapted to enter any of said slots.

6. In a work holder, the combination of a frame, a screw threaded therein, a stepped abutment loosely surrounding the screw, the different steps thereof being arranged in an annular course about the screw axis and exposed internally and externally, a projecting shoulder on the screw adapted to engage any of the steps, the body of the abutment projecting beyond the face of the steps on each side thereof, to prevent the rotation thereof when the screw shoulder engages the abutment.

7. The combination of a frame, a screw threaded thereinto, a member surrounding the screw axis and having an annular series of notches therein leading from one end of the member parallel with the screw axis for various depths, said notches being open on their outer sides, and an abutment member adapted to coact with any of the notches.

8. A device of the class described comprising a shank having its inner end threaded, a sleeve slidable upon said shank and having a plurality of longitudinally extending edge notches of different depths in one end, said shank having a laterally extending pin adapted to selectively engage the several notches referred to above.

9. A work holder of the class described comprising an annular body portion having a plurality of radially spaced bosses, work engaging shanks having threaded portions screwing in said bosses whereby the shanks may be adjusted to engage the work within said body, sleeves mounted upon said shanks and having a plurality of longitudinal radially spaced notches in the rear edges thereof, said notches being of different length, a laterally extending pin carried by the outer portion of said shank and adapted to selectively engage said notches whereby to variably limit movement of said sleeve in the direction of the outer extremity of said shank.

In witness whereof I affix my signature.

BRADFORD T. BORDEN.